(12) United States Patent
Nomura

(10) Patent No.: US 6,204,776 B1
(45) Date of Patent: Mar. 20, 2001

(54) COMMUNICATION ABNORMALITY DETECTING/COPING DEVICE AND VACUUM PUMP REMOTE MONITOR CONTROL DEVICE

(75) Inventor: Shinichi Nomura, Chiba (JP)

(73) Assignee: Seiko Seiki Kabushiki Kaisha (JP)

( * ) Notice: Subject to any disclaimer, the term of this patent is extended or adjusted under 35 U.S.C. 154(b) by 0 days.

(21) Appl. No.: 09/537,943

(22) Filed: Mar. 29, 2000

(30) Foreign Application Priority Data

Mar. 30, 1999 (JP) .................................................. 11-090284

(51) Int. Cl.[7] ...................................................... G01V 3/00
(52) U.S. Cl. .................. 340/853.2; 340/309.15; 340/309.3; 709/232; 455/67.4
(58) Field of Search .......................... 340/309.15, 309.3, 340/853.2, 853.7, 870.01, 825.44, 825.5, 539; 709/224, 229, 232; 455/31.1, 67.4

(56) References Cited

U.S. PATENT DOCUMENTS 5,070,536 * 12/1991 Mahany et al. ...................... 455/67.4
5,815,667 * 9/1998 Chien et al. .......................... 709/232
5,825,992 * 10/1998 Satoh .................................. 358/1.16
6,088,407 * 9/1998 Buternowsky et al. ............. 375/347

FOREIGN PATENT DOCUMENTS 57-032450   2/1982   (JP) .
10283022   10/1998   (JP) .

* cited by examiner

Primary Examiner—Van T. Trieu
(74) Attorney, Agent, or Firm—Adams & Wilks

(57) ABSTRACT

A communication abnormality detecting/coping device and a vacuum pump remote monitor control device are provided, which are capable of detecting the presence/absence of an abnormality in data communication and reducing an influence of the abnormality on a system device when detecting the abnormality. An operation acknowledge message 51 is transmitted to a system device (30) from a turbo-molecular pump control device (20) in Step 1. A reply message (53) indicative of the reception of the operation acknowledgement message 51 by the system device (30) is transmitted to the turbo-molecular pump control device (20) in Step 3. In Step 5, an elapsed period of from a time at which the operation acknowledgement message (51) is transmitted to a time at which a reply message (53) is received is measured, and if the elapsed period exceeds the preset period, the abnormality in the communication system is warned in Step 6.

6 Claims, 5 Drawing Sheets

COMMUNICATION ABNORMALITY DETECTING/COPING DEVICE AND VACUUM PUMP REMOTE MONITOR CONTROL DEVICE

BACKGROUND OF THE INVENTION

1. Field of the Invention

The present invention relates to a communication abnormality detecting/coping device and a vacuum pump remote monitor control device, and more particularly to a communication abnormality detecting/coping device and a vacuum pump remote monitor control device, which are capable of detecting the presence/absence of an abnormality in data communication and reducing an influence of the abnormality on a system device when detecting the abnormality.

2. Description of the Related Art

FIG. 3 is a diagram showing the entire structure of a magnetic floatation type turbo-molecular pump 10. Referring to FIG. 3, a rotor 1 is axially floated by an axial electromagnet 3, and radial position control thereof is conducted by radial electromagnets 5A and 5B. Then, the rotor 1 is rotated by a motor 7. A plurality of rotating blades 9 are axially formed in the rotor 1. A plurality of fixed blades 11 are disposed at the rotating blades with a gap therebetween. One ends of the fixed blades 11 are supported between a plurality of fixed wing spacers 13 which are stacked one on another.

In the turbo-molecular pump 10 thus structured, gas molecules are struck by the rotating blades 9 during its rotation so as to be moved axially, thereby exhausting a gas. The turbo-molecular pump 10 of this type is, for example, used to exhaust the gas from a chamber of an etching device for manufacturing semiconductor (hereinafter referred to as "system device 30"). A gas is always supplied to the chamber to process the semiconductor, and the supplied gas is exhausted by the turbo-molecular pump 10.

In the case where the turbo-molecular pump 10 is controlled by the system device 30, on/off signals using a relay have been employed as input/output signals from/to the turbo-molecular pump 10 up to now.

However, in the case where the relay is used, multiple wirings are arranged to cause an increase in cost and an increase in size. Also, there arises such a problem that analog information of r.p.m. or the like cannot be inputted or outputted.

To cope with the above problem, serial communication control using an RS 232 cable 21 or the like is recently increasingly implemented as shown in FIG. 4. Referring to FIG. 4, the turbo-molecular pump 10 is connected to a bus 25 through a drive circuit 23. The bus 25 is connected with switches such as a stop switch 29 or a start switch 31 through a switch I/F circuit 27.

The bus 25 is connected with a liquid crystal display 33. The bus 25 is also connected with a communication circuit 35 and the system device 30 through the RS232 cable 21. A turbo-molecular pump control device 20 enclosed by a dotted line in FIG. 4 is thus formed with the driver circuit 23, the switch I/F circuit 27, the liquid crystal display 33, the communication circuit 35, a CPU 37 and so on.

By the way, in a conventional case where data communication is conducted between the turbo-molecular pump control device 20 and the system device 30 through the RS232 cable 21 or the like, there may arise the following problems.

FIG. 5 illustrates data communication between the turbo-molecular pump control device 20 and the system device 30.

In FIG. 5, data communication in a normal operation is shown. For example, a command 41 such as a start command is transmitted to the turbo-molecular pump control device 20 from the system device 30. The turbo-molecular pump control device 20 returns an acknowledgement signal 43 (hereinafter referred to as "ACK 43") indicative of the reception of the command 41 to the system device 30 and simultaneously starts the turbo-molecular pump 10.

Then, in the case where, for example, r.p.m. data is required in the system device 30, a data request signal 45 is transmitted to the turbo-molecular pump control device 20 by the system device 30. The turbo-molecular pump control device 20 transmits r.p.m. data 47 to the system device 30 in response to the data request signal 45. The system device 30 transmits an ACK 49 which is an acknowledgement signal indicative of the reception of the r.p.m. data 47 to the turbo-molecular pump control device 20.

Thereafter, in the case where a trouble (program runaway) on the part of the system device 30, the disconnection of the cable, falling-out of a connector or the like occurs while the turbo-molecular pump 10 is rotating, communication is hung up. In this situation, because the turbo-molecular pump control device 20 is of a slave, it cannot acknowledge the communication state with the system device 30 which is of a master. As a result, even in the case where the turbo-molecular pump 10 must stop, it continues to rotate, and an energy is unnecessarily consumed.

Also, depending on the operating state, there is a fear that a trouble may be caused in a process on the system device 30 side by stoppage of the turbo-molecular pump 10 immediately after the disenablement of the data communication.

SUMMARY OF THE INVENTION

The present invention has been made in view of the above problems with the conventional device, and therefore an object of the present invention is to provide a communication abnormality detecting/coping device and a vacuum pump remote monitor control device, which are capable of detecting the presence/absence of an abnormality in data communication and reducing an influence of the abnormality on a system device when detecting the abnormality.

In order to achieve the above object, according to the present invention, there is provided a communication abnormality detecting/coping device comprising:

a system device;

a control/display device for conducting data communication with the system device;

a first message transmission means for periodically transmitting a first message to the system device from the control/display device;

a second message transmission means for periodically transmitting a second message to the control/display device from the system device;

a communication system abnormality judging means for measuring an elapsed period of from a time of transmission of the first message by the first message transmission means to a time of reception of the second message transmitted from the second message transmission means and received by the control/display device to judge whether the measured elapsed period exceeds a preset period, or not; and a warning/coping means for warning the abnormality of a communication system or coping with the abnormality of the communication system when the communication system abnormality judging means judges that the measured elapsed period exceeds the preset period, characterized in that one of the second message transmission means and the first message transmission means sends an operation acknowledgement message for acknowledging that data communication is enabled between the system device and the control/display device, and the other thereof sends a reply message indicative of the acknowledgement of the operation acknowledgement message.

The first message transmission means periodically transmits the first message to the system device from the control/display device. The second message transmission means periodically transmits the second message to the control/display device from the system device.

The communication system abnormality judging means measures the elapsed period of from a time of transmission of the first message by the first message transmission means to a time of reception of the second message transmitted from the second message transmission means by the control/display device. Then, the communication system abnormality judging means judges whether the measured elapsed period exceeds a preset period, or not.

One of the second message transmission means and the first message transmission means sends an operation acknowledgement message for acknowledging that data communication is enabled between the system device and the control/display device, and the other thereof sends a reply message indicative of the acknowledgement of the operation acknowledgement message.

The elapsed period measured by the communication system abnormality judging means is within the set period if data communication is normally conducted. If an abnormality occurs in data communication, the operation acknowledgement message or the reply message is not received even when the elapsed period exceeds the set period in the control/display device. In this situation, the warning/coping means warns the abnormality of a communication system or copes with the abnormality of the communication system.

The coping includes, for example, fail safe and a stoppage of the main parts of the system although it varies depending on the attribute of the system. With the above structure, the presence/absence of the abnormality in data communication can be readily detected. Also, since the communication abnormality detecting/coping device can be structured simply by addition of software, it is inexpensive. Further, since a time required for acknowledgement of the abnormality is short, the normal operation is executed without hindrance.

Also, according to the present invention, the device is characterized in that the warning/coping means warns the abnormality of a communication system or copes with the abnormality of the communication system after a predetermined period is elapsed when the communication system abnormality judging means judges that the measured elapsed period exceeds the preset period.

Warning or coping is not conducted immediately after the measured period by the communication system abnormality judging means exceeds the predetermined set time, but a delay time for a predetermined period is provided. Warning or coping is conducted after the predetermined period is elapsed.

With the above structure, commutation system abnormality processing is conducted in conformity with the characteristic of the system device.

In addition, according to the present invention, the predetermined period can be canceled.

There is a case in which warning or coping is unnecessary depending on the degree, the kind, etc., of the communication system abnormality. Assuming this case, the predetermined period can be canceled.

Further, according to the present invention, there is provided a vacuum pump remote monitor control device comprising:

a vacuum pump control device for controlling a vacuum pump having a magnetic bearing that magnetically floats a rotator in the air;

a system device that conducts data communication with the vacuum pump control device, and monitors or controls equipment including the vacuum pump control device;

a first message transmission means for periodically transmitting a first message to the system device from the vacuum pump control device;

a second message transmission means for periodically transmitting a second message to the vacuum pump control device from the system device;

a communication system abnormality judging means for measuring an elapsed period of from a time of transmission of the first message by the first message transmission means to a time of reception of the second message transmitted from the second message transmission means and received by the vacuum pump control device to judge whether the measured elapsed period exceeds a preset period, or not; and a warning/coping means for warning the abnormality of a communication system or stopping the rotator of the vacuum pump when the communication system abnormality judging means judges that the elapsed period exceeds the preset period, characterized in that one of the second message transmission means and the first message transmission means sends an operation acknowledgement message for acknowledging that data communication is enabled between the system device and the vacuum pump control device, and the other thereof sends a reply message indicative of the acknowledgement of the operation acknowledgement message.

The vacuum pump is, for example, a turbo-molecular pump, or a drag pump.

With application of the above structure, in the case where a communication abnormality occurs, the vacuum pump is stopped, to thereby make it possible to prevent an energy from being unnecessarily consumed.

Also, since, for example, the exhaust of a gas from the chamber is prevented from being rapidly stopped with the provision of the delay time before the vacuum pump stops, a problem with the process on the system device side can be suppressed to the least.

Further, according to the present invention, the device is characterized in that the warning/coping means warns the abnormality of a communication system or stops the rotator of the vacuum pump after a predetermined period is elapsed when the communication system abnormality judging means judges that the measured elapsed period exceeds the preset period.

In addition, according to the present invention, the predetermined period can be canceled.

BRIEF DESCRIPTION OF THE DRAWINGS

These and other objects, features and advantages of the present invention will become more fully apparent from the following detailed description taken with the accompanying drawings in which.

DETAILED DESCRIPTION OF THE PREFERRED EMBODIMENTS

Figure 3:
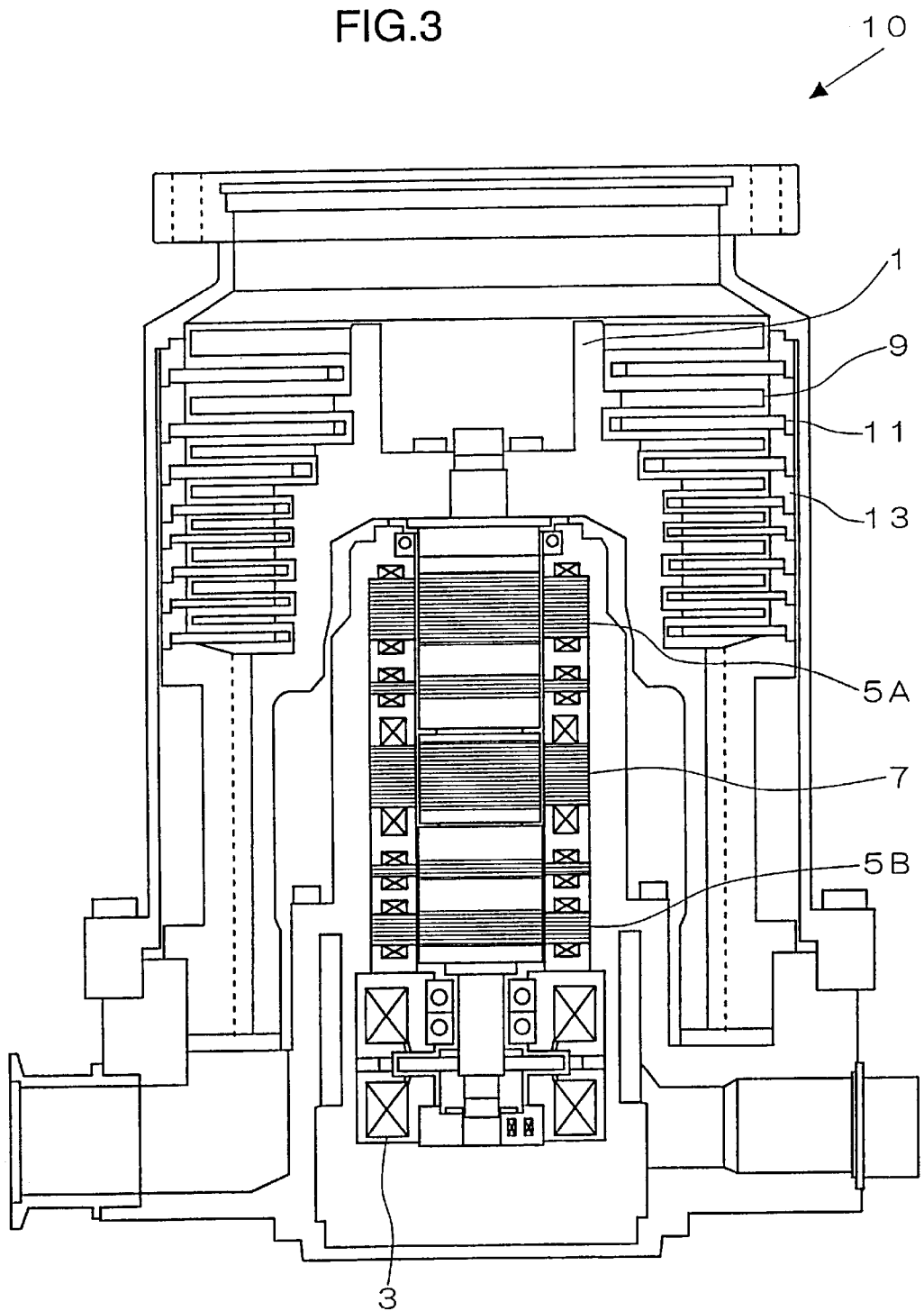
FIG. 3 is a diagram showing the entire structure of a turbo-molecular pump.
Figure 4:
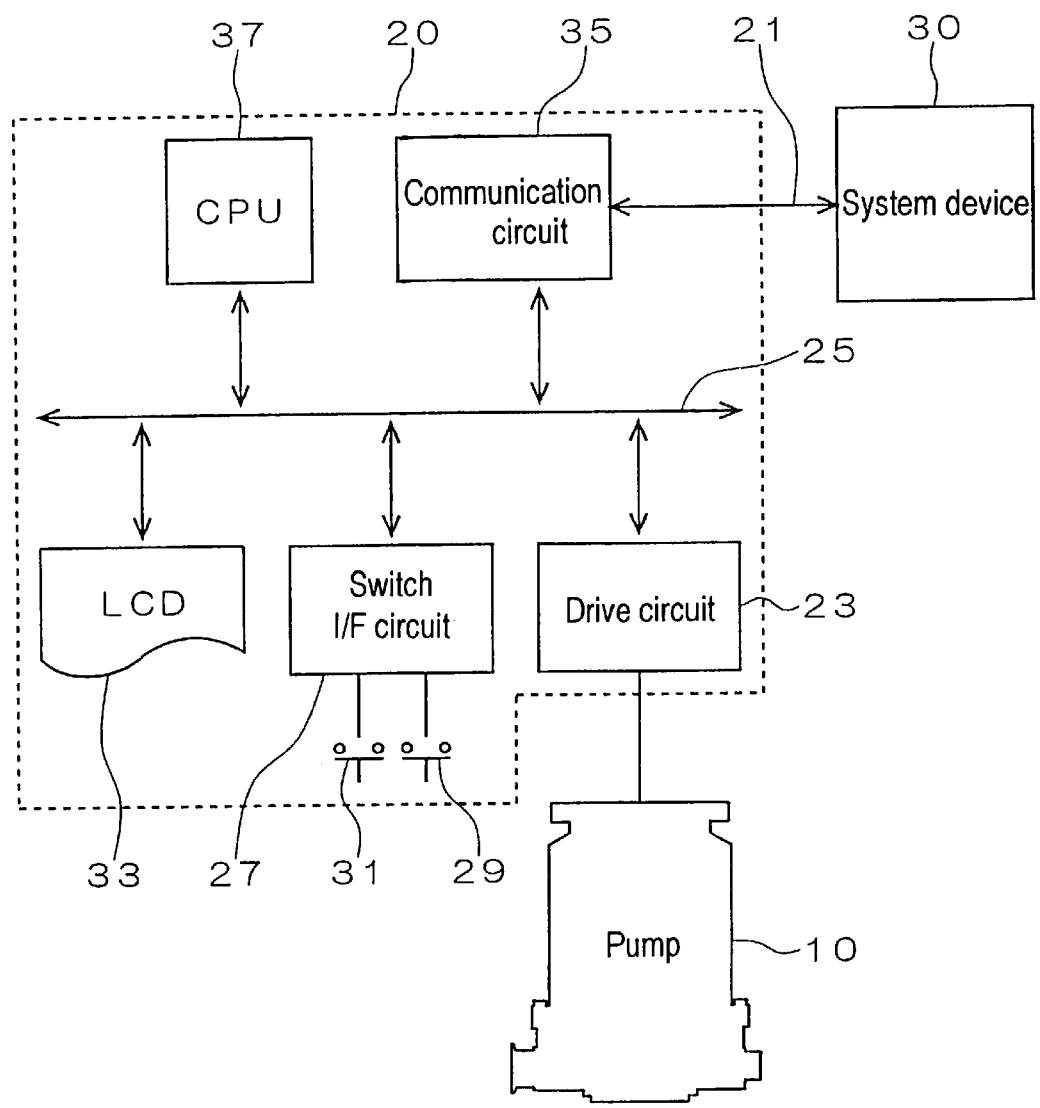
FIG. 4 is a diagram showing a structural example of control with a serial communication.
Figure 5:
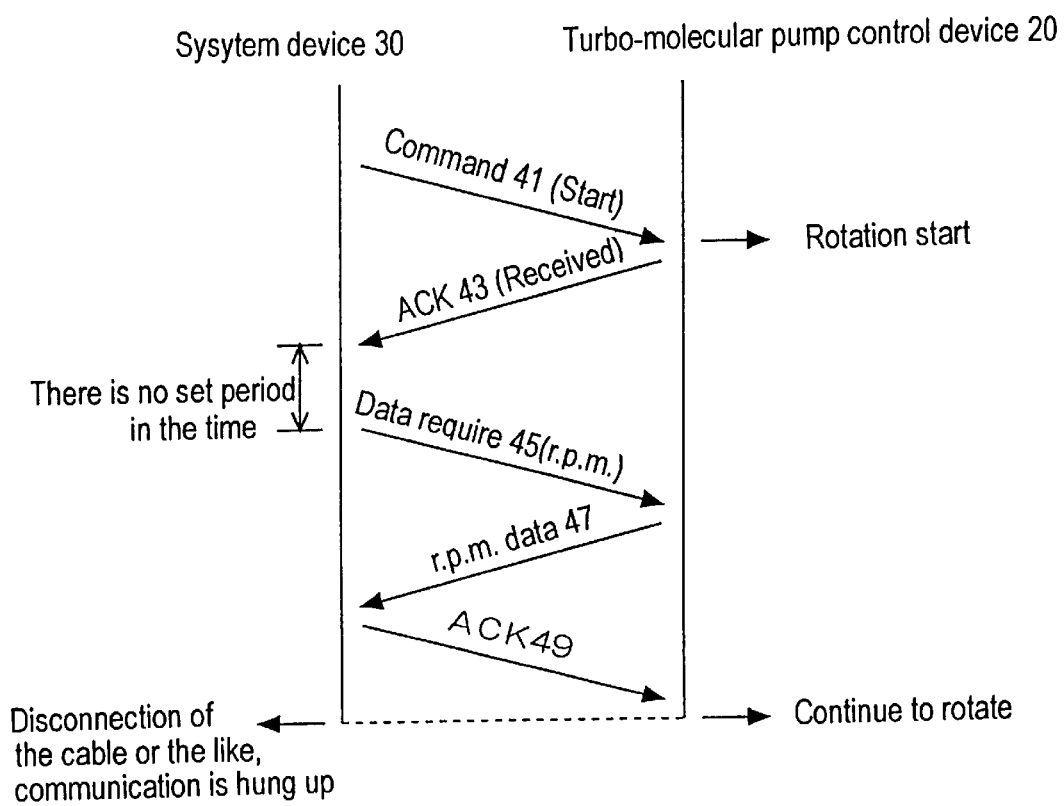
FIG. 5 illustrates data communication between the turbo-molecular pump control device and the system device in the prior art.

Now, a description will be given in more detail of a first embodiment of the present invention. The structural diagram of this embodiment according to the present invention is identical with that of FIGS. 3 and 4.

Hereinafter, the operation of this embodiment according to the present invention will be described with reference to a flowchart shown in FIG. 1 and a diagram illustrating data communication between a turbo-molecular pump control device 20 and a system device 30 shown in FIG. 2.

Figure 1:
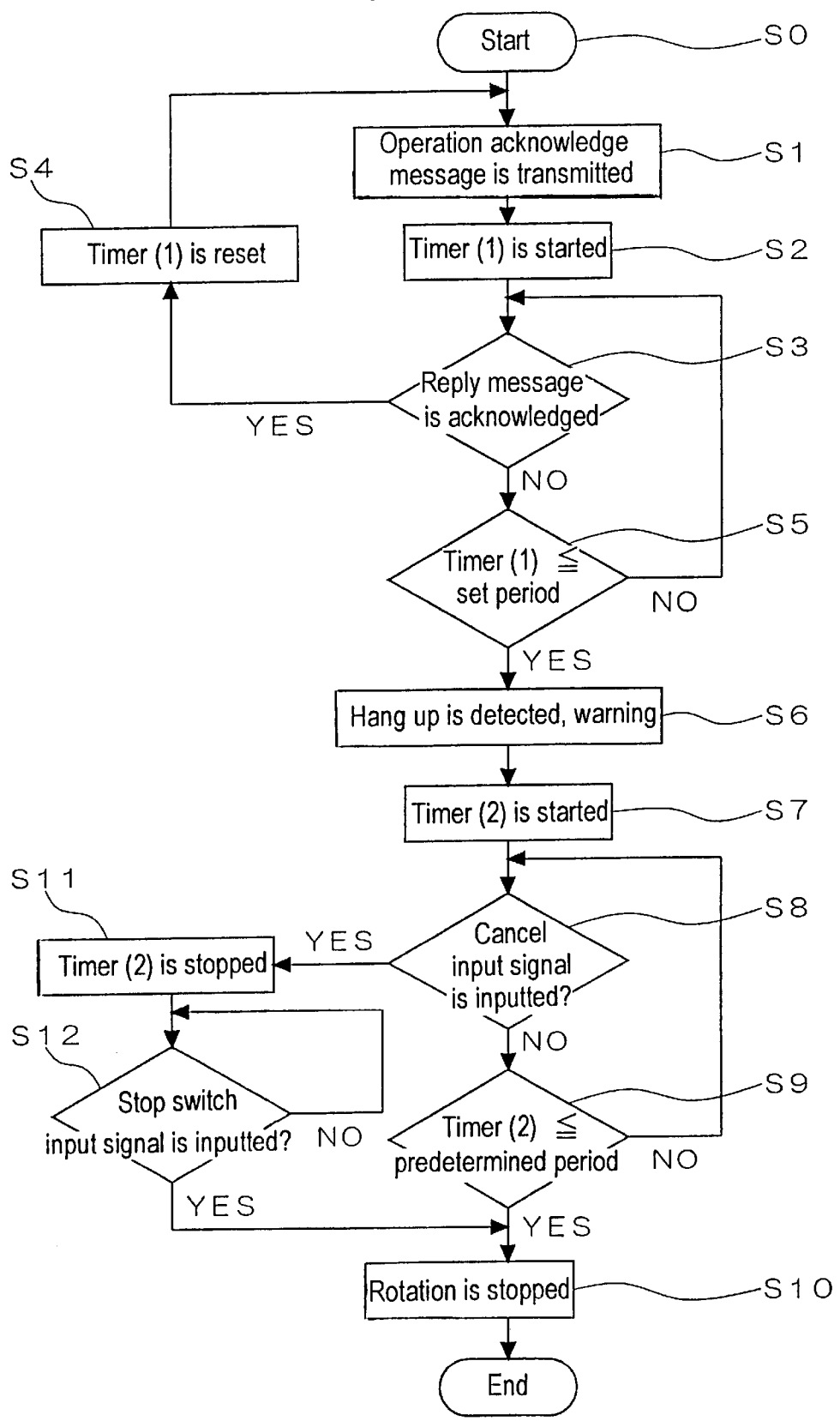
FIG. 1 is a flowchart showing the operation of a communication abnormality detecting/coping device in accordance with the present invention.
Figure 2:
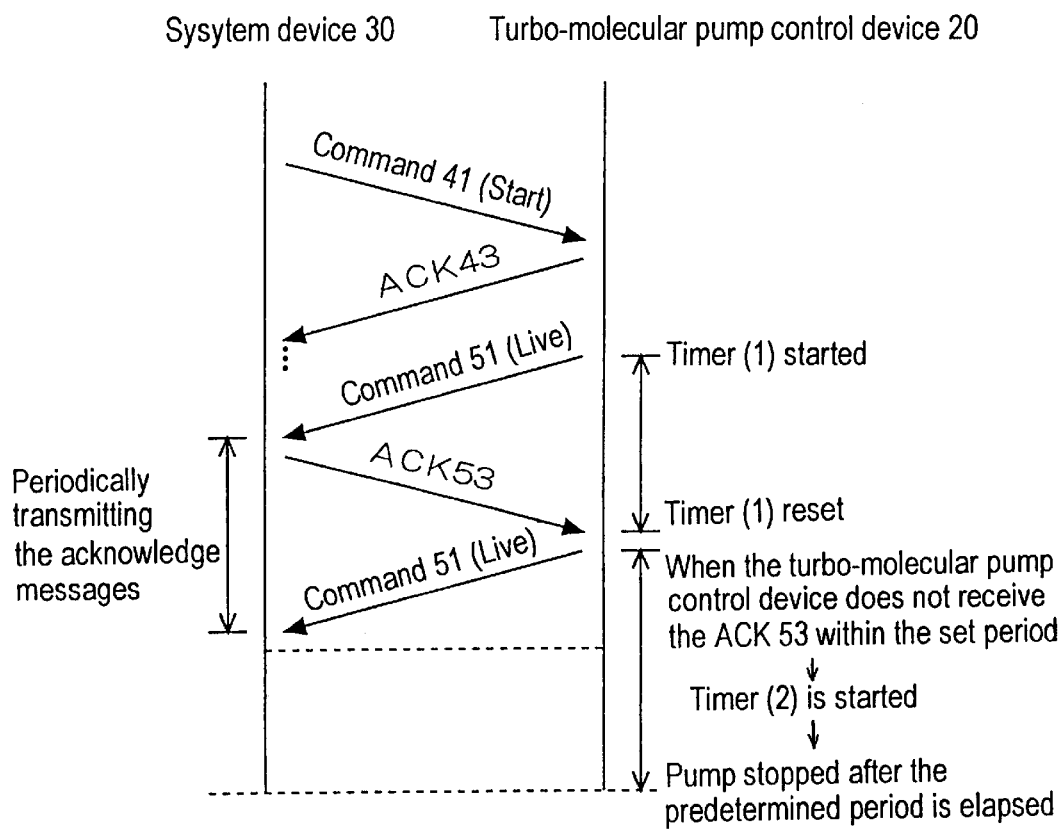
FIG. 2 is a diagram illustrating data communication between a turbo-molecular pump control device and a system device in accordance with the present invention.

Referring to FIG. 1, an operation acknowledge message 51 is transmitted to the system device 30 from the turbo-molecular pump control device 20 in Step 1 (S1 in FIG. 1, and the same is applied to other steps). The operation acknowledgement message 51 is periodically dispatched from the turbo molecular pump control device 20 side during communication such as an operation command or the acknowledgement of the operating state as well as a reply to those commands, which are conducted arbitrarily, as shown in FIG. 2. However, if there exists an interruption high in priority in the system, the priority may be taken into equation.

A timer (1) is started in Step 2. A reply message 53 indicative of the reception of the operation acknowledgement message 51 by the system device 30 is transmitted to the turbo-molecular pump control device 20 in Step 3. If the reply message 53 is acknowledged, the operation is advanced to Step 4 where the timer (1) is reset.

If the turbo-molecular pump control device 20 waits for the reply to the operation acknowledgement message 51 and acknowledges the reply message 53, it judges that the system device 30 is normal, and stands by for a succeeding periodic transmission of an operation acknowledgement message. Then, the operation returns Step 1 again and transmits the operation acknowledgement message 51.

If the reply message 53 cannot be acknowledged in Step 3, and the timer (1) exceeds the set time in Step 5, it is judged in Step 6 that communication is hung up, and communication system abnormality is warned by means of the liquid crystal display 33. If the timer (1) is within a set period in Step 5, the operation returns to Step 3 where the acknowledgement processing of the reply message 53 is conducted.

Then, after the communication system abnormality is warned in Step 6, the operation is advanced to Step 7, and the timer (2) is started. Then, it is judged in Step 8 whether a cancel input signal is inputted by a switch I/F circuit 27, or not. The cancel is inputted through switching operation by an operator or the like when it is judged in the acknowledging work after the communication system abnormality is warned, that stopping of the turbo-molecular pump 10 is unnecessary.

The switching operation may be directly conducted by a switch connected to the switch I/F circuit 27, or may be conducted through soft switching operation by displaying a menu, select buttons, etc., on the liquid crystal display 33. The turbo-molecular pump control device 20 waits for the cancel input for a predetermined period in Step 9. If there is no cancel input within the predetermined period, the turbo-molecular pump 10 is stopped in Step 10.

On the other hand, if there is the cancel input in Step 8, the operation is advanced to Step 11 to stop a timer(2). Thereafter, the turbo-molecular pump control device 20 waits for input of a stop switch 29 in Step 12, and if the stop switch 29 is depressed, the operation is advanced to Step 10 in which the turbo-molecular pump 10 is stopped.

In this embodiment of the present invention, the operation acknowledgement message 51 is transmitted to the system device 30 from the turbo-molecular pump control device 20. Alternatively, the operation acknowledgement message 51 may be transmitted to the turbo-molecular pump control device 20 from the system device 30 in Step 1.

In this case, the turbo-molecular pump control device 20 transmits the reply message 53 to the system device 30 after the reception of the operation acknowledgement message 51 and starts the timer (1). Then, when the turbo-molecular pump control device 20 does not receive a succeeding operation acknowledgement message 51 within the set period, it starts the timer (2) and stops the turbo-molecular pump 10.

Also, the processing of acknowledging the reply message 53 is again continuously conducted after the timer (2) is started in Step 7, and if the reply message 53 can be acknowledged, the timer (2) may be reset and the operation is resumed.

With the above operation, the presence/absence of an abnormality in the communication state can be acknowledged in a time as short as the normal operation is conducted without hindrance by simple software processing.

Also, in the case where the communication abnormality occurs, the vacuum pump is stopped, thereby making it possible to prevent the energy from being unnecessarily consumed.

In addition, because, for example, the exhaust of a gas from the chamber is prevented from being rapidly stopped with the provision of a delay time before the stoppage of the vacuum pump, a problem with the process on the system device side can be suppressed to the least.

As has been described above, according to the present invention, an elapsed period of from a time at which the first message is transmitted to a time at which the second message is received is measured, and if the elapsed period exceeds the preset period, the abnormality in the communication system is warned. With this operation, the presence/absence of the abnormality in data communication can be readily detected.

Also, with the provision of the delay period for a predetermined period of time, the commutation system abnormality processing is conducted in conformity with the characteristic of the system device.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A communication abnormality detecting/coping device comprising:

a system device;

a control/display device for conducting data communication with the system device;

a first message transmission means for periodically transmitting a first message to the system device from the control/display device;

a second message transmission means for periodically transmitting a second message to the control/display device from the system device;

a communication system abnormality judging means for measuring an elapsed period of from a time of transmission of the first message by the first message transmission means to a time of reception of the second message transmitted from the second message transmission means and received by the control/display device to judge whether the measured elapsed period exceeds a preset period, or not; and a warning/coping means for warning the abnormality of a communication system or coping with the abnormality of the communication system when the communication system abnormality judging means judges that the measured elapsed period exceeds the preset period, wherein one of the second message transmission means and the first message transmission means sends an operation acknowledgement message for acknowledging that data communication is enabled between the system device and the control/display device, and the other thereof sends a reply message indicative of the acknowledgement of the operation acknowledgement message.

2. The communication abnormality detecting/coping device as claimed in claim 1, wherein the warning/coping means warns the abnormality of a communication system or copes with the abnormality of the communication system after a predetermined period is elapsed when the communication system abnormality judging means judges that the elapsed period exceeds the preset period.

3. The communication abnormality detecting/coping device as claimed in claim 2, wherein the predetermined period can be canceled.

4. A vacuum pump remote monitor control device comprising:

a vacuum pump control device for controlling a vacuum pump having a magnetic bearing that magnetically floats a rotator in the air;

a system device that conducts data communication with the vacuum pump control device, and monitors or controls an equipment including the vacuum pump control device;

a first message transmission means for periodically transmitting a first message to the system device from the vacuum pump control device;

a second message transmission means for periodically transmitting a second message to the vacuum pump control device from the system device;

a communication system abnormality judging means for measuring an elapsed period of from a time of transmission of the first message by the first message transmission means to a time of reception of the second message transmitted from the second message transmission means and received by the vacuum pump control device to judge whether the measured elapsed period exceeds a preset period, or not; and a warning/coping means for warning the abnormality of a communication system or stopping the rotator of the vacuum pump when the communication system abnormality judging means judges that the elapsed period exceeds the preset period, wherein one of the second message transmission means and the first message transmission means sends an operation acknowledgement message for acknowledging that data communication is enabled between the system device and the vacuum pump control device, and the other thereof sends a reply message indicative of the acknowledgement of the operation acknowledgement message.

5. The vacuum pump remote monitor control device as claimed in claim 4, wherein the warning/coping means warns the abnormality of a communication system or stops the rotator of the vacuum pump after a predetermined period is elapsed when the communication system abnormality judging means judges that the elapsed period exceeds the preset period.

6. The vacuum pump remote monitor control device as claimed in claim 5, wherein the predetermined period can be canceled.

* * * * *